US011496963B2

(12) United States Patent
Liu et al.

(10) Patent No.: US 11,496,963 B2
(45) Date of Patent: Nov. 8, 2022

(54) UPLINK CHANNEL SENDING METHOD AND DEVICE

(71) Applicant: Huawei Technologies Co., Ltd., Shenzhen (CN)

(72) Inventors: Zhe Liu, Beijing (CN); Xingwei Zhang, Lund (SE); Jie Shi, Shenzhen (CN); Hao Sun, Beijing (CN)

(73) Assignee: HUAWEI TECHNOLOGIES CO., LTD., Shenzehn (CN)

( * ) Notice: Subject to any disclaimer, the term of this patent is extended or adjusted under 35 U.S.C. 154(b) by 126 days.

(21) Appl. No.: 16/875,561

(22) Filed: May 15, 2020

(65) Prior Publication Data

US 2020/0280924 A1    Sep. 3, 2020

Related U.S. Application Data

(63) Continuation of application No. PCT/CN2018/115255, filed on Nov. 13, 2018.

(30) Foreign Application Priority Data

Nov. 16, 2017 (CN) .......................... 201711139514.5

(51) Int. Cl.
*H04W 52/08* (2009.01)
*H04L 5/00* (2006.01)
(Continued)

(52) U.S. Cl.
CPC .......... *H04W 52/08* (2013.01); *H04L 5/0007* (2013.01); *H04L 5/0092* (2013.01); *H04L 27/2605* (2013.01); *H04W 72/0413* (2013.01)

(58) Field of Classification Search
CPC . H04W 52/08; H04W 72/0413; H04W 52/14; H04W 52/54; H04W 72/04;
(Continued)

(56) References Cited

U.S. PATENT DOCUMENTS

2013/0114562 A1    5/2013   Seo et al.
2016/0029239 A1    1/2016   Sadeghi et al.
(Continued)

FOREIGN PATENT DOCUMENTS

CN     103580783 A     2/2014
CN     105163326 A    12/2015
(Continued)

OTHER PUBLICATIONS

Interdigital, Inc., "Bandwidth Adaptation via BWP Selection in NR," 3GPP TSG RAN WG1 NR Ad-Hoc #2, R1-1710878, Qingdao, China, Jun. 27-30, 2017, 3 pages.
(Continued)

*Primary Examiner* — Sharmin Chowdhury
(74) *Attorney, Agent, or Firm* — Conley Rose, P.C.

(57) ABSTRACT

An uplink channel sending method includes sending, by a terminal device, a first uplink channel to a network device at a first power in a first time unit of a first Bandwidth Part (BWP) region, and sending, by the terminal device, the first uplink channel to the network device at a second power in a second time unit of a second BWP region. The second time unit is adjacent to the first time unit, the second BWP region is different from the first BWP region, and the second power is determined using a reset accumulated closed-loop power, an absolute closed-loop power, or the first power and an offset value.

20 Claims, 10 Drawing Sheets

(51) Int. Cl.
*H04L 27/26* (2006.01)
*H04W 72/04* (2009.01)

(58) Field of Classification Search
CPC . H04L 5/0007; H04L 5/0092; H04L 27/2605; H04L 5/00
See application file for complete search history.

(56) References Cited

U.S. PATENT DOCUMENTS

| | | | | |
|---|---|---|---|---|
| 2018/0124815 | A1* | 5/2018 | Papasakellariou | ........................... H04W 72/0446 |
| 2018/0146433 | A1* | 5/2018 | Zhang | ................... H04W 52/06 |
| 2018/0332541 | A1 | 11/2018 | Liu et al. | |
| 2020/0008155 | A1 | 1/2020 | Li et al. | |
| 2020/0068509 | A1* | 2/2020 | Ahn | ................... H04W 52/365 |
| 2020/0136878 | A1* | 4/2020 | Yi | ........................ H04W 24/10 |
| 2020/0163024 | A1* | 5/2020 | Li | ........................ H04W 52/38 |
| 2020/0228264 | A1* | 7/2020 | Kreienkamp | ......... H04L 1/0009 |

FOREIGN PATENT DOCUMENTS

| | | |
|---|---|---|
| CN | 109600826 A | 4/2019 |
| EP | 3478019 A1 | 5/2019 |
| EP | 3592045 A1 | 1/2020 |

OTHER PUBLICATIONS

MediaTek Inc., "Further Details on Bandwidth Part Operation in NR," 3GPP TSG RAN WG1 Meeting #90, R1-17013978, Prague, Czech Republic, Aug. 21-25, 2017, 10 pages.

Huawei et al., "General considerations on UL power control design," 3GPP TSG RAN WG1 Meeting 90bis, R1-1717311, Prague, Czech Republic, Oct. 9-13, 2017, 8 pages.

Intel Corporation, "Remaining Details on UL Power Control Framework," 3GPP TSG RAN WG1 Meeting 90bis, R1-1717408, Prague, CZ, Oct. 9-13, 2017, 5 pages.

Vivo, "Remaining issues on NR UL power control," 3GPP TSG RAN WG1 Meeting #90bis, R1-1717508, Prague, CZ, Oct. 9-13, 2017, 5 pages.

Samsung, "The Impact of Bandwidth Part on RAN2: Overview and Issues," 3GPP TSG RAN WG2 #99bis, R2-1711595, Prague, Czech Republic, Oct. 9-13, 2017, 8 pages.

LG Electronics, "Further clarification for wideband operation of NR UE," 3GPP TSG-RAN WG4 NR AH #3 meeting, R4-1709579, Nagoya, Japan, Sep. 18-21, 2017, 9 pages.

* cited by examiner

———— A PUSCH carries UCI

............ A PUSCH does not carry UCI

UPLINK CHANNEL SENDING METHOD AND DEVICE

CROSS-REFERENCE TO RELATED APPLICATIONS

This application is a continuation of International Patent Application No. PCT/CN2018/115255 filed on Nov. 13, 2018, which claims priority to Chinese Patent Application No. 201711139514.5 filed on Nov. 16, 2017. The disclosures of the aforementioned applications are hereby incorporated by reference in their entireties.

TECHNICAL FIELD

This application relates to the field of wireless communications technologies, and in particular, to an uplink channel sending method and a device.

BACKGROUND

In a Long-Term Evolution (LTE) system, uplink power control plays a very important role in radio resource management, and is also a very important factor that affects system performance and a system capacity. Main objectives of uplink power control are to compensate for a slow change of a channel environment and reduce interference between neighboring cells.

Currently, in the LTE system, an uplink channel (for example, a physical uplink shared channel (PUSCH) or a physical uplink control channel (PUCCH)) may use open-loop power control, or may use closed-loop power control. Closed-loop power control may be classified into accumulated closed-loop power control and an absolute closed-loop power. In the LTE system, data is transmitted using a subframe. Therefore, accumulated closed-loop power control means that an uplink channel transmit power of a terminal device in a current subframe is related to that of the terminal device in a previous subframe, and absolute closed-loop power control means that the uplink channel transmit power of the terminal device in the current subframe is unrelated to that of the terminal device in the previous subframe. A PUSCH is used as an example. If accumulated closed-loop power control is used, a power for sending the PUSCH in a subframe i by the terminal device may be $f_c(i)=f_c(i-1)+\delta_{PUSCH,c}(i-K_{PUSCH})$, or if absolute closed-loop power control is used, a power for sending the PUSCH in a subframe i by the terminal device may be $f_c(i)=\delta_{PUSCH,c}(i-K_{PUSCH})$. i represents a subframe number, $f_c(i)$ represents the power for sending the PUSCH in the subframe i, $f_c(i-1)$ represents a power for sending the PUSCH in a subframe (i−1), and $\delta_{PUSCH,c}(i-K_{PUSCH})$ represents a power adjustment value.

In a New Radio (NR) system, because an uplink bandwidth allocated to a terminal device is comparatively large, a concept of a bandwidth part (BWP) region is introduced. A network device may configure one or more BWPs for a terminal device, and uplink data is transmitted each time a BWP is activated. In this application scenario, if accumulated closed-loop power control is used to adjust an uplink channel transmit power, and BWP switching occurs in this case, there is no corresponding solution for determining the uplink channel transmit power in other approaches. It should be noted that in the NR system, data is transmitted using a slot. For example, the network device schedules the terminal device in a slot (i−1) to transmit uplink data using a BWP 1. However, due to channel quality or the like, the network device schedules the terminal device in a slot i to transmit the uplink data using a BWP 2. In this case, there is no corresponding solution for the terminal device to determine a power for sending the uplink channel in the slot i.

SUMMARY

This application provides an uplink channel sending method and a device, to determine, when a transmit power of a first uplink channel is to be determined using an accumulated closed-loop power, the transmit power of the first uplink channel if BWP region switching occurs.

According to a first aspect, this application provides an uplink channel sending method, including sending, by a terminal device, a first uplink channel to a network device at a first power in a first time unit of a first BWP region, and sending, by the terminal device, the first uplink channel to the network device at a second power in a second time unit of a second BWP region, where the second time unit is adjacent to the first time unit, the second BWP region is different from the first BWP region, and the second power is determined using a reset accumulated closed-loop power, or the second power is determined using an absolute closed-loop power, or the second power is determined using the first power and an offset value.

According to the method in this application, when a transmit power of the first uplink channel is to be determined using a closed-loop power, the transmit power of the first uplink channel may be directly and accurately determined if BWP region switching occurs.

In a possible design, before sending, by the terminal device, the first uplink channel to the network device at a second power in a second time unit of a second BWP region, the method includes receiving, by the terminal device, first indication information sent by the network device, where the first indication information is used to instruct to switch an active BWP region of the terminal device to the second BWP region.

In this embodiment of this application, the first indication information may directly carry the offset value used to calculate the second power, without additional indication by the network device, thereby reducing signaling overheads.

In a possible design, when the second power is determined using the first power and the offset value, the terminal device obtains the offset value in the manner of obtaining, by the terminal device, a parameter that affects the offset value, and determining, by the terminal device, the offset value based on the parameter.

In this embodiment of this application, the terminal device may directly calculate, based on a parameter of the terminal device, the offset value used to calculate the second power, without additional indication by the network device, thereby reducing signaling overheads.

In a possible design, the parameter that affects the offset value includes at least one of channel quality, a bandwidth of the first BWP region, a bandwidth of the second BWP region, a center frequency of the first BWP region, a center frequency of the second BWP region, a type of uplink information, a beam direction, and a waveform type.

In a possible design, when the second power is determined using the first power and the offset value, the terminal device obtains the offset value in the following manner receiving, by the terminal device, second indication information sent by the network device, where the second indication information carries the offset value, and determining, by the terminal device, the offset value based on the second indication information.

In this embodiment of this application, the network device may directly indicate, to the terminal device, the offset value used to calculate the second power, and the terminal device may directly use the offset value without further processing, thereby reducing a power of the terminal device.

In a possible design, when the second power is determined using the first power and the offset value, the terminal device obtains the offset value in the manner of receiving, by the terminal device, third indication information sent by the network device, where the third indication information is used to indicate a first offset parameter and a second offset parameter, the first offset parameter corresponds to the first BWP region, and the second offset parameter corresponds to the second BWP region, and determining, by the terminal device, the offset value based on the first offset parameter and the second offset parameter.

In a possible design, when the second power is determined using the first power and the offset value, the terminal device obtains the offset value in the manner of receiving, by the terminal device, fourth indication information sent by the network device, where the fourth indication information is used to instruct to switch an active bandwidth of the terminal device to the second bandwidth region, and determining, by the terminal device, the offset value based on the fourth indication information.

In a possible design, at least one closed-loop power control process is configured for the terminal device, and the first time unit and the second time unit are adjacent time units in a same closed-loop power control process.

In this embodiment of this application, different closed-loop power control processes may be configured for the terminal device based on different factors such as a transmit power such that the second power determined by the terminal device is more accurate.

In a possible design, a first closed-loop power control process and a second closed-loop power control process are configured for the terminal device, and an uplink channel in the first closed-loop power control process carries uplink control information (UCI), and an uplink channel in the second closed-loop power control process does not carry the UCI, or an uplink time unit in the first closed-loop power control process includes a first quantity of orthogonal frequency-division multiplexing (OFDM) symbols, and an uplink time unit in the second closed-loop power control process includes a second quantity of OFDM symbols, or an uplink time unit in the first process is used to send a short uplink control channel, and an uplink time unit in the second process is used to send a long uplink control channel, or an uplink channel in the first process carries UCI and the UCI occupies a data amount less than or equal to a first bit, and an uplink channel in the second process carries UCI and the UCI occupies a data amount greater than the first bit.

In a possible design, the first closed-loop power control process includes the first time unit and the second time unit, and the second closed-loop power control process includes a third time unit and a fourth time unit, and the method further includes sending, by the terminal device, the first uplink channel to the network device at a third power in the third time unit of the first BWP region, and sending, by the terminal, the first uplink channel to the network device at a fourth power in the fourth time unit of the second BWP region, where the fourth power is determined using a reset accumulated closed-loop power, or the fourth power is determined using an absolute closed-loop power, or the fourth power is determined using the third power and an offset value, or the fourth power is determined using the second power.

In this embodiment of this application, the terminal device may calculate the fourth power based on the second power that is also in the second part of the BWP such that the calculated fourth power is more accurate.

It should be noted that, in this embodiment of the first aspect, the second indication information, the third indication information, the fourth indication information, and the first indication information may be simultaneously sent, or the second indication information, the third indication information, and the fourth indication information may be carried in the first indication information, or the second indication information, the third indication information, and the fourth indication information may be sent after the first indication information.

According to a second aspect, an uplink channel receiving method is provided, including receiving, by a network device in a first time unit of a first BWP region, a first uplink channel sent by a terminal device at a first power, and receiving, by the network device in a second time unit of a second BWP region, the first uplink channel sent by the terminal device at a second power, where the second time unit is adjacent to the first time unit, the second BWP region is different from the first BWP region, and the second power is determined using a reset accumulated closed-loop power, or the second power is determined using an absolute closed-loop power, or the second power is determined using the first power and an offset value.

In a possible design, before receiving, by the network device in a second time unit of a second BWP region, the first uplink channel sent by the terminal device at a second power, the method further includes sending, by the network device, first indication information to the terminal device, where the first indication information is used to instruct to switch an active BWP region of the terminal device to the second BWP region.

In a possible design, before receiving, by the network device in a second time unit of a second BWP region, the first uplink channel sent by the terminal device at a second power, the method further includes sending, by the network device, second indication information to the terminal device, where the second indication information carries the offset value.

In a possible design, before receiving, by the network device in a second time unit of a second BWP region, the first uplink channel sent by the terminal device at a second power, the method further includes sending, by the network device, third indication information to the terminal device, where the third indication information is used to indicate a first offset parameter and a second offset parameter, and the first offset parameter and the second offset parameter are used to determine the offset value.

In a possible design, at least one closed-loop power control process is configured for the terminal device, and the first time unit and the second time unit are adjacent time units in a same closed-loop power control process.

In a possible design, a first closed-loop power control process and a second closed-loop power control process are configured for the terminal device, and an uplink channel in the first closed-loop power control process carries UCI, and an uplink channel in the second closed-loop power control process does not carry the UCI, or an uplink time unit in the first closed-loop power control process includes a first quantity of OFDM symbols, and an uplink time unit in the second closed-loop power control process includes a second quantity of OFDM symbols, or an uplink time unit in the first process is used to send a short uplink control channel, and an uplink time unit in the second process is used to send a long uplink control channel, or an uplink channel in the first process carries UCI and the UCI occupies a data amount less than or equal to a first bit, and an uplink channel in the second process carries UCI and the UCI occupies a data amount greater than the first bit.

In a possible design, the first closed-loop power control process includes the first time unit and the second time unit, and the second closed-loop power control process includes a third time unit and a fourth time unit, and the method further includes receiving, by the network device in the third time unit of the first BWP region, the first uplink channel sent by the terminal device at a third power, and receiving, by the terminal device in the fourth time unit of the second BWP region, the first uplink channel sent by the terminal device at a fourth power, where the fourth power is determined using a reset accumulated closed-loop power, or the fourth power is determined using an absolute closed-loop power, or the fourth power is determined using the third power and an offset value, or the fourth power is determined using the second power.

According to a third aspect, a terminal device is provided, including a processor configured to determine a first power and a second power, and a transceiver configured to send a first uplink channel to a network device at a first power in a first time unit of a first BWP region, and send the first uplink channel to the network device at a second power in a second time unit of a second BWP region, where the second time unit is adjacent to the first time unit, the second BWP region is different from the first BWP region, and the second power is determined using a reset accumulated closed-loop power, or the second power is determined using an absolute closed-loop power, or the second power is determined using the first power and an offset value.

In a possible design, the transceiver is further configured to receive first indication information sent by the network device, where the first indication information is used to instruct to switch an active BWP region of the terminal device to the second BWP region.

In a possible design, when the second power is determined using the first power and the offset value, the processor obtains the offset value in the following manner obtaining a parameter that affects the offset value, and determining the offset value based on the parameter.

In a possible design, the parameter that affects the offset value includes at least one of channel quality, a bandwidth of the first BWP region, a bandwidth of the second BWP region, a center frequency of the first BWP region, a center frequency of the second BWP region, a type of uplink information, a beam direction, and a waveform type.

In a possible design, when the second power is determined using the first power and the offset value, the transceiver is further configured to receive second indication information sent by the network device, where the second indication information carries the offset value, and the processor is further configured to determine the offset value based on the second indication information.

In a possible design, when the second power is determined using the first power and the offset value, the transceiver is further configured to receive third indication information sent by the network device, where the third indication information is used to indicate a first offset parameter and a second offset parameter, the first offset parameter corresponds to the first BWP region, and the second offset parameter corresponds to the second BWP region, and the processor is further configured to determine the offset value based on the first offset parameter and the second offset parameter.

In a possible design, when the second power is determined using the first power and the offset value, the transceiver is further configured to receive fourth indication information sent by the network device, where the fourth indication information is used to instruct to switch an active bandwidth of the terminal device to the second bandwidth region, and the processor is further configured to determine the offset value based on the fourth indication information.

In a possible design, at least one closed-loop power control process is configured for the terminal device, and the first time unit and the second time unit are adjacent time units in a same closed-loop power control process.

In a possible design, a first closed-loop power control process and a second closed-loop power control process are configured for the terminal device, and an uplink channel in the first closed-loop power control process carries UCI, and an uplink channel in the second closed-loop power control process does not carry the UCI, or an uplink time unit in the first closed-loop power control process includes a first quantity of OFDM symbols, and an uplink time unit in the second closed-loop power control process includes a second quantity of OFDM symbols, or an uplink time unit in the first process is used to send a short uplink control channel, and an uplink time unit in the second process is used to send a long uplink control channel, or an uplink channel in the first process carries UCI and the UCI occupies a data amount less than or equal to a first bit, and an uplink channel in the second process carries UCI and the UCI occupies a data amount greater than the first bit.

In a possible design, the first closed-loop power control process includes the first time unit and the second time unit, and the second closed-loop power control process includes a third time unit and a fourth time unit, and the transceiver is further configured to send the first uplink channel to the network device at a third power in the third time unit of the first BWP region, and send the first uplink channel to the network device at a fourth power in the fourth time unit of the second BWP region, where the fourth power is determined using a reset accumulated closed-loop power, or the fourth power is determined using an absolute closed-loop power, or the fourth power is determined using the third power and an offset value, or the fourth power is determined using the second power.

According to a fourth aspect, this application provides a network device, including a transceiver configured to receive, in a first time unit of a first BWP region, a first uplink channel sent by a terminal device at a first power, and receive, in a second time unit of a second BWP region, the first uplink channel sent by the terminal device at a second power, where the second time unit is adjacent to the first time unit, the second BWP region is different from the first BWP region, and the second power is determined using a reset accumulated closed-loop power, or the second power is determined using an absolute closed-loop power, or the second power is determined using the first power and an offset value, and a processor configured to process the first uplink channel.

In a possible design, the transceiver is further configured to send first indication information to the terminal device, where the first indication information is used to instruct to switch an active BWP region of the terminal device to the second BWP region.

In a possible design, the transceiver is further configured to send second indication information to the terminal device, where the second indication information carries the offset value.

In a possible design, the transceiver is further configured to send third indication information to the terminal device, where the third indication information is used to indicate a first offset parameter and a second offset parameter, and the first offset parameter and the second offset parameter are used to determine the offset value.

In a possible design, at least one closed-loop power control process is configured for the terminal device, and the first time unit and the second time unit are adjacent time units in a same closed-loop power control process.

In a possible design, a first closed-loop power control process and a second closed-loop power control process are configured for the terminal device, and an uplink channel in the first closed-loop power control process carries UCI, and an uplink channel in the second closed-loop power control process does not carry the UCI, or an uplink time unit in the first closed-loop power control process includes a first quantity of OFDM symbols, and an uplink time unit in the second closed-loop power control process includes a second quantity of OFDM symbols, or an uplink time unit in the first process is used to send a short uplink control channel, and an uplink time unit in the second process is used to send a long uplink control channel, or an uplink channel in the first process carries UCI and the UCI occupies a data amount less than or equal to a first bit, and an uplink channel in the second process carries UCI and the UCI occupies a data amount greater than the first bit.

In a possible design, the first closed-loop power control process includes the first time unit and the second time unit, and the second closed-loop power control process includes a third time unit and a fourth time unit, and the transceiver is further configured to receive, in the third time unit of the first BWP region, the first uplink channel sent by the terminal device at a third power, and receive, in the fourth time unit of the second BWP region, the first uplink channel sent by the terminal device at a fourth power, where the fourth power is determined using a reset accumulated closed-loop power, or the fourth power is determined using an absolute closed-loop power, or the fourth power is determined using the third power and an offset value, or the fourth power is determined using the second power.

According to a fifth aspect, this application provides a communications system, including the terminal device according to any one of the foregoing implementations or aspects and the network device according to any one of the foregoing implementations or aspects.

According to a sixth aspect, this application provides a computer readable storage medium, including an instruction. When the instruction is run on a communications device, the communications device is enabled to perform the uplink channel sending method according to any one of the foregoing implementations or aspects.

According to a seventh aspect, this application provides a chip. The chip is connected to a memory, and is configured to read and execute a software program stored in the memory, to implement the uplink channel sending method according to any one of the foregoing implementations or aspects.

According to an eighth aspect, this application provides an apparatus, including a processor and a memory. The memory stores a program or an instruction, and when the program or the instruction is executed by the processor, the uplink channel sending method according to any one of the foregoing implementations or aspects is implemented.

DESCRIPTION OF EMBODIMENTS

The embodiments of this application provide an uplink channel sending method and a device, to determine, when a transmit power of a first uplink channel is to be determined using an accumulated closed-loop power, the transmit power of the first uplink channel if BWP region switching occurs. The method and the device are based on a same concept. Because principles of the method and the device for resolving a problem are similar, cross reference may be made between apparatus embodiments and method embodiments, and no repetitions are described.

The following clearly and completely describes the technical solutions in the embodiments of this application with reference to the accompanying drawings in the embodiments of this application.

Figure 1:
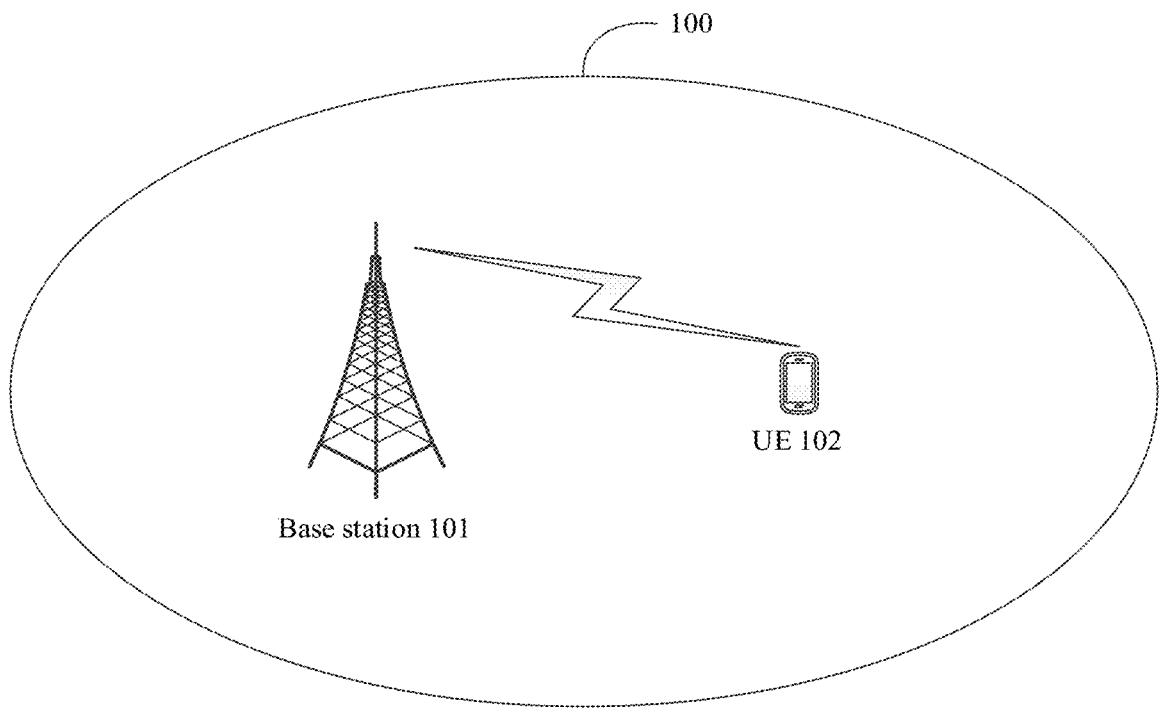
FIG. 1 is a schematic diagram of a communications system according to an embodiment of this application.

FIG. 1 shows a communications system 100 according to an embodiment of this application. The communications system 100 includes a base station 101 and UE 102.

The base station 101 is responsible for providing a radio access-related service for the UE 102, and implementing a radio physical layer function, resource scheduling and radio resource management, quality of service (QoS) management, radio access control, and a mobility management function.

The UE 102 is a device that accesses a network using the base station 101.

The base station 101 is connected to the UE 102 through an interface Uu in order to implement communication between the UE 102 and the base station 101.

In this embodiment of this application, a plurality of BWP regions may be configured for the UE 102. The BWP region may include a group of physical resource blocks (PRBs) that are consecutive in frequency. The base station 101 may activate different BWPs for the UE 102 in different slots to transmit an uplink channel. For example, the base station 101 may configure a BWP 1, a BWP 2, and a BWP 3 for the UE 102. The base station 101 may instruct, in a slot 1, the UE 102 to send an uplink channel using the BWP 1, and instruct, in a slot 2, the UE 102 to send an uplink channel using the BWP 2. The uplink channel mainly includes a PUSCH and a PUCCH.

An uplink power control technology is usually used for the uplink channel to compensate for a slow change of a channel environment and reduce interference from neighboring cells. In addition, it is currently agreed that accumulated closed-loop power control may be used for the uplink channel PUCCH, and accumulated closed-loop power control and absolute closed-loop power control may be used for the uplink channel PUSCH.

In an example of this application, accumulated closed-loop power control is implemented using $f_c(i,l)=f_c(i-1,l)+\delta_{PUSCH,c}(i-K_{PUSCH})$ Formula (1), and absolute closed-loop power control is implemented using $f_c(i,l)=\delta_{PUSCH,c}(i-K_{PUSCH})$ Formula (2).

i represents an uplink channel transmission time unit, 1 represents a closed-loop power control process, $f_c(i,l)$ represents a power for sending an uplink channel in the uplink channel transmission time unit i, $f_c(i-1,l)$ represents a power for sending the uplink channel in an uplink channel transmission time unit (i−1), and $\delta_{PUSCH,c}(i-K_{PUSCH})$ represents a power adjustment value, a value of $\delta_{PUSCH,c}(i-K_{PUSCH})$ may be configured by the base station 101 for the terminal device 101 using downlink control information (DCI) signaling or an enabling parameter (Accumulation-enabled).

This application is mainly to calculate, when accumulated closed-loop power control is used to calculate a transmit power of an uplink channel, the transmit power of the uplink channel if BWP switching occurs. For example, referring to the foregoing Formula (1), if the UE 102 sends the uplink channel to the base station 101 at $f_c(i-1,l)$ in the uplink channel transmission time unit (i−1) of the BWP 1, where 1 is a closed-loop power control process, and if the base station 101 performs switching to the BWP 2 in the uplink time unit i, a problem about how to calculate the power of the uplink channel sent on the BWP 2 in the slot i is resolved.

In the foregoing application scenario, the base station 101 is an apparatus that is deployed in a radio access network and that is configured to provide a wireless communication function for the UE 102. The base station 101 may include macro base stations, micro base stations (also referred to as small cells), relay nodes, access points, and the like in various forms. A device having a function of a base station may have different names in systems that use different radio access technologies. For example, the device is referred to as an evolved NodeB (eNB or eNodeB) in an LTE system, is referred to as a NodeB in a 3rd generation (3G) system, and is referred to as a gNB in an NR system. For ease of description, in all the embodiments of this application, apparatuses that provide a wireless communication function for the UE 2 are collectively referred to as a base station.

In the foregoing application scenarios, the UE 102 may include various handheld devices, vehicle-mounted devices, wearable devices, or computing devices that have a wireless communication function, or other processing devices connected to a wireless modem. The UE may also be referred to as a mobile station (MS), a terminal, or terminal equipment, or the UE may further include a subscriber unit, a cellular phone, a smartphone, a wireless data card, a personal digital assistant (PDA) computer, a tablet computer, a wireless modem, a handheld device, a laptop computer, a cordless phone or a wireless local loop (WLL) station, a Machine Type Communication (MTC) terminal, or the like. For ease of description, the devices mentioned above are collectively referred to as UE in all the embodiments of this application.

In the foregoing application scenarios, the communications system 100 may be Various radio access technology (RAT) systems, for example, a code-division multiple access (CDMA) system, a time-division multiple access (TDMA) system, a frequency-division multiple access (FDMA) system, an orthogonal FDMA (OFDMA) system, and a single-carrier FDMA (SC-FDMA) system. The terms "system" and "network" are interchangeable. A radio technology such as universal terrestrial radio access (UTRA) or CDMA 2000 may be implemented in the CDMA system. The UTRA may include a wideband CDMA (WCDMA) technology and another variant technology of CDMA. CDMA 2000 may cover the interim standard (IS) 2000 (IS-2000), the IS-95 standard, and the IS-856 standard. A radio technology such as a Global System for Mobile Communications (GSM) may be implemented in the TDMA system. A radio technology such as evolved UTRA (E-UTRA), Ultra Mobile Broadband (UMB), Institute of Electrical and Electronics Engineers IEEE 802.11 (WI-FI), IEEE 802.16 (WIMAX), IEEE 802.20, or Flash OFDMA may be implemented in the OFDMA system. UTRA corresponds to Universal Mobile Telecommunications System (UMTS), and E-UTRA corresponds to an evolved version of the UMTS. 3rd Generation Partnership Project (3GPP) LTE and evolved releases based on LTE are new UMTS releases based on E-UTRA. In addition, the communications system is further applicable to a future-oriented communication technology. Provided that a communications system that uses a new communications technology includes bearer setup, the communications system is applicable to the technical solutions provided in the embodiments of this application. A system architecture and a service scenario described in the embodiments of this application are intended to describe the technical solutions in the embodiments of this application more clearly, and do not constitute a limitation to the technical solutions provided in the embodiments of this application. A person of ordinary skill in the art may learn that, with evolution of network architectures and emergence of new service scenarios, the technical solutions provided in the embodiments of this application are also applicable to a similar technical problem.

It should be noted that the communications system 100 shows only one base station 101 and one UE 102 as an example, and is not considered as a limitation to this application. The communications system 100 may set any quantity of base stations 101 and UEs 102 as required.

For ease of understanding by a person skilled in the art, the following explains and describes some terms in this application.

Time unit: may be a slot. The slot may include 14 OFDM symbols. The slot may alternatively be a short slot (mini-slot), and the mini-slot may include two, four, or seven OFDM symbols. The slot may alternatively be a long slot, that is, slot aggregation.

BWP region: includes a series of consecutive or non-consecutive PRBs. The entire uplink bandwidth of the UE may include a plurality of PRBs. In this case, the base station may configure a plurality of BWPs for the UE. For example, if an entire uplink bandwidth of the UE includes 50 PRBs, the base station may configure four BWPs for the UE: a BWP 1, a BWP 2, a BWP 3, and a BWP 4, and each BWP occupies 12 PRBs. Certainly, different BWPs of the UE may occupy different PRBs, or may occupy a same PRB.

(3) Resetting an accumulated closed-loop power: A transmit power of an uplink channel is calculated by reusing the accumulated closed-loop power. For details, refer to the foregoing Formula (1). After the accumulated closed-loop power is reset, the transmit power of the uplink channel is $f_c(0,l)$.

(4) First uplink channel: is a channel or a signal sent by UE to a base station. For example, the first uplink channel may be a PUCCH, a PUSCH, or a sounding reference signal (SRS). A power for sending the first uplink channel in a second time unit is adjusted based on a power for sending the first uplink channel in a first time unit and based on a factor such as a channel quality change, and an adjusted power is sent.

(5) "A plurality of": indicates at least two, and other quantifiers are similar to this.

(6) "And/Or": describes an association relationship between associated objects and indicates that three relationships may exist. For example, A and/or B may represent the following three cases: only A exists, both A and B exist, and only B exists. The character "/" generally indicates an "or" relationship between the associated objects.

In addition, it should be understood that in the description of this application, terms such as "first" and "second" are merely used for differentiation and description, but should not be understood as an indication or implication of relative importance or an indication or implication of an order.

Figure 2:
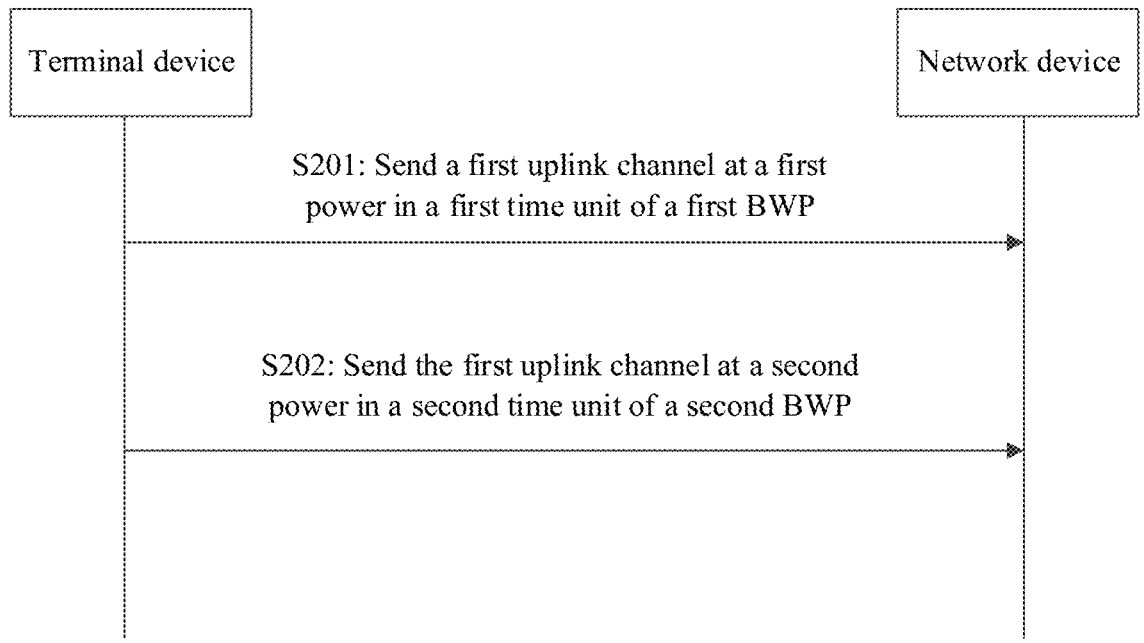
FIG. 2, FIG. 3, FIG. 4, FIG. 5, FIG. 6, and FIG. 7 show uplink channel sending methods according to embodiments of this application.

Based on the communications system 100 shown in FIG. 1, as shown in FIG. 2, this application provides an uplink channel sending method. In FIG. 2, a terminal device may be the UE 102 in FIG. 1, and a network device may be the base station 101 in FIG. 1. The method includes the following steps.

Step S201: The terminal device sends a first uplink channel to the network device at a first power in a first time unit of a first BWP.

In this embodiment of this application, the first uplink channel may be a PUCCH, a PUSCH, or an SRS.

Step S202: The terminal device sends the first uplink channel to the network device at a second power in a second time unit of a second BWP.

In this embodiment of this application, the first BWP is different from the second BWP, and the second time unit is adjacent to the first time unit. The second power is determined using a reset accumulated closed-loop power, or the second power is determined using an absolute closed-loop power, or the second power is determined using the first power and an offset value.

In this embodiment of this application, division into different processes may be performed in advance for the terminal device, or division into different processes may not be performed in advance for the terminal device. If division into different processes is performed for the terminal device, the first time unit and the second time unit are adjacent in the process. For example, if a process includes a slot 1, a slot 3, and a slot 5, the slot 1 and the slot 3 may be referred to as adjacent slots, and the slot 3 and the slot 5 may also be referred to as adjacent slots. If division into different processes is not performed for the terminal device, the first time unit and the second time unit are time-adjacent units. For example, the slot 1 and a slot 2 may be referred to as time-adjacent units, and the slot 2 and the slot 3 may also be referred to as time-adjacent units.

In an example of this application, for example, the first time unit is a slot 1, the second time unit is a slot 2, the first BWP is a BWP 1, and the second BWP is a BWP 2. The terminal device may calculate the first power using an accumulated closed-loop power. For a calculation formula of the accumulated closed-loop power, refer to the foregoing Formula (1). In addition, the terminal device sends the first uplink channel to the network device at the first power in the BWP 1 of the slot 1. If the network device receives indication information before the slot 2, where the indication information is used to instruct to switch an active BWP from the BWP 1 to the BWP 2, the network device may reset a closed-loop power, calculate the second power of the uplink channel, and send the first uplink channel at the second power in the slot 2 of the BWP 2. The resetting the closed-loop power is calculating a transmit power by reusing the accumulated closed-loop power, and the second power may be a value obtained when i=0 in the foregoing Formula (1), that is, the second power is $f_c(0,l)$. Alternatively, the network device may calculate the second power of the first uplink channel using the absolute closed-loop power, that is, directly indicate a power adjustment value using dynamic signaling. The dynamic signaling may be DCI signaling. Alternatively, the terminal device may determine the second power based on a value of L(1,l) in the foregoing Formula (1) and the offset value. How to determine the offset value is described in detail in the following embodiments.

It can be learned from the foregoing that, in this embodiment of this application, when BWP switching occurs, the terminal device may directly determine the second power using the reset accumulated closed-loop power, the absolute closed-loop power, or the first power and the offset value. This can resolve a problem that when the transmit power of the uplink channel is to be determined using the accumulated closed-loop power, the power cannot be accurately or appropriately adjusted if BWP switching occurs.

Figure 3:
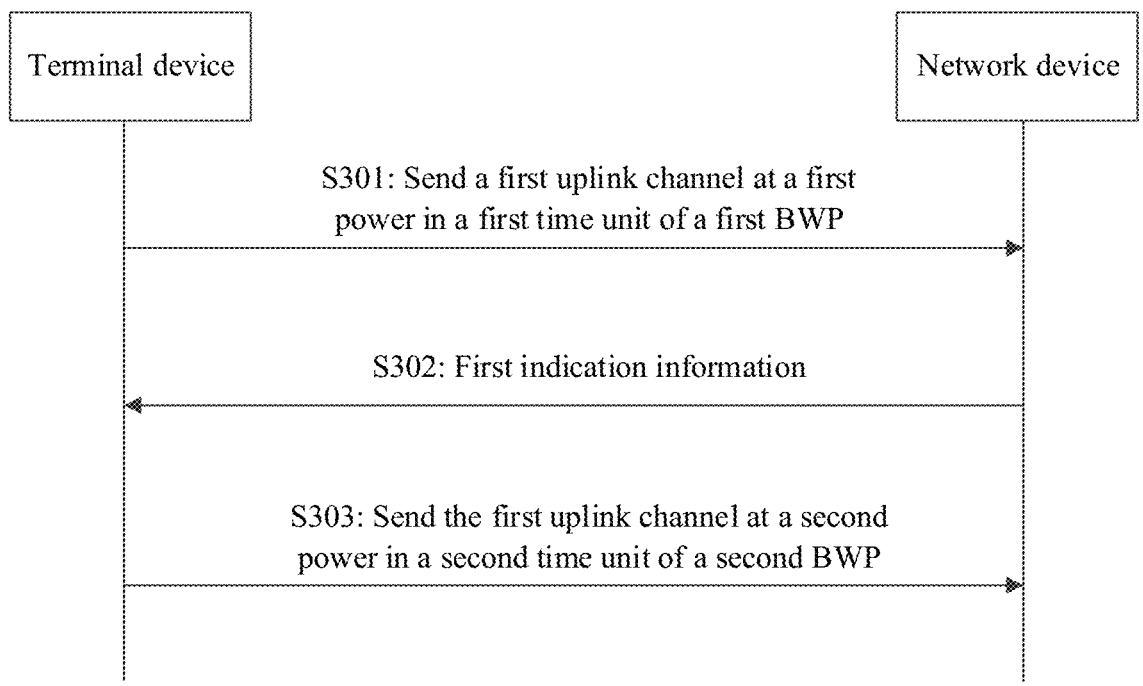

Based on the communications system 100 shown in FIG. 1, as shown in FIG. 3, this application provides an uplink channel sending method. In FIG. 3, a terminal device may be the UE 102 in FIG. 1, and a network device may be the base station 101 in FIG. 1. The method includes the following steps.

Step S301: The terminal device sends a first uplink channel to the network device at a first power in a first time unit of a first BWP.

Step S302: The network device sends first indication information to the terminal device, where the first indication information is used to instruct to switch an active BWP region of the terminal device to the second BWP. For example, the first indication information may be DCI signaling.

In this embodiment of this application, when receiving the first indication information, the terminal device may switch the active BWP from the first BWP to the second BWP, and may determine a second power in the following manners.

Manner 1: The second power is calculated using a reset accumulated closed-loop power, or the second power is calculated using an absolute closed-loop power. For how to calculate the second power using the reset accumulated closed-loop power or the absolute closed-loop power, refer to the description in the foregoing embodiments. Details are not described herein again.

Manner 2: The second power is calculated using an offset value and the first power. In an example, the terminal device may obtain a parameter that affects the offset value, where the parameter that affects the offset value includes at least one of channel quality, a bandwidth of the first BWP region, a bandwidth of the second BWP region, a center frequency of the first BWP region, a center frequency of the second BWP region, a type of uplink information, a beam direction, and a waveform type, and the terminal device may determine the offset value based on the parameter.

Step S303: The terminal device sends the first uplink channel to the network device at the second power in a second time unit of the second BWP.

It can be learned from the foregoing that, in this embodiment of this application, when receiving the first indication information for BWP switching, the terminal device may directly determine the second power using information on the terminal device, and the network device does not need to send additional indication information, thereby reducing signaling overheads.

Figure 4:
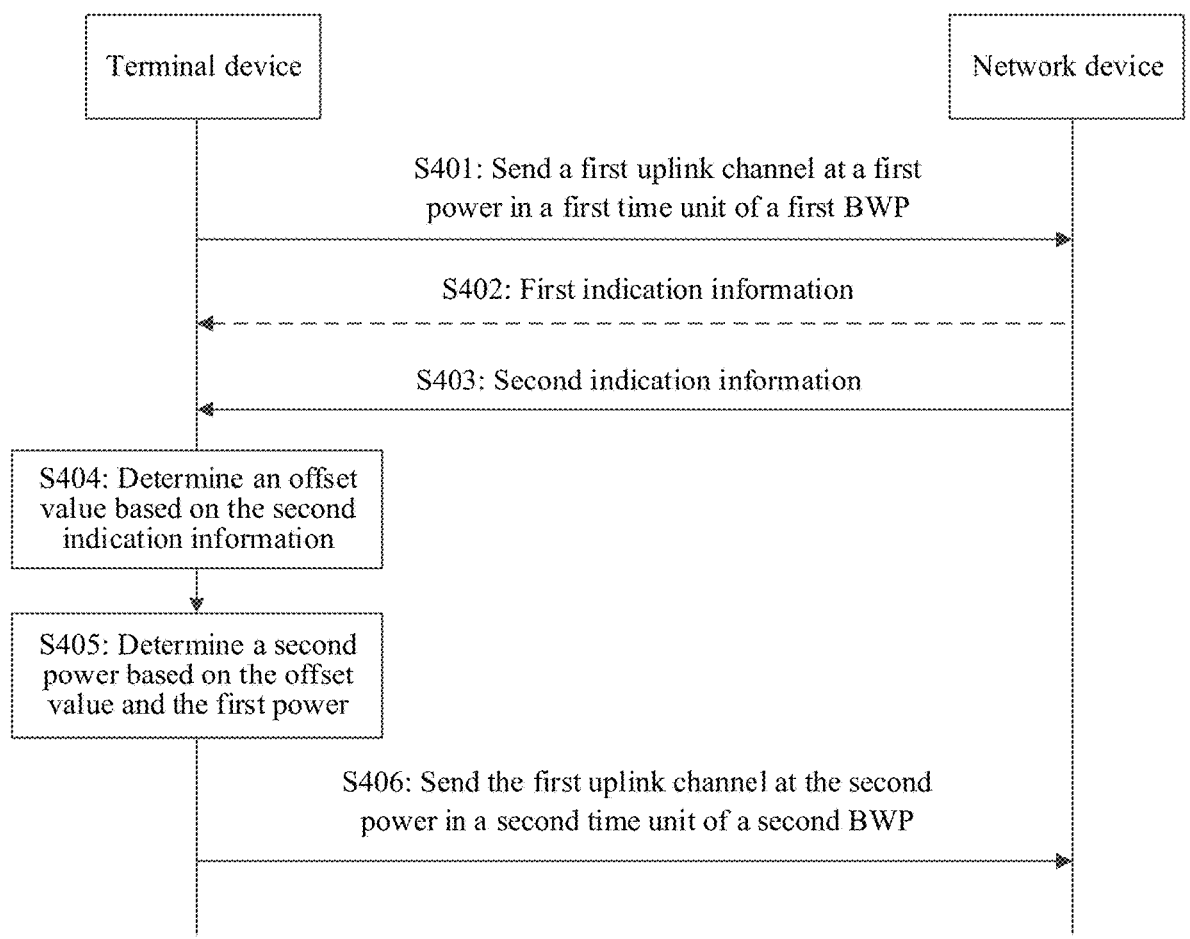

Based on the communications system 100 in FIG. 1, as shown in FIG. 4, this application provides an uplink channel sending method. In FIG. 4, a terminal device may be further the UE 102 in FIG. 1, and a network device may be further the base station 101 in FIG. 1. The method includes the following steps.

Step S401: The terminal device sends a first uplink channel to the network device at a first power in a first time unit of a first BWP.

Optionally, after step S401, the method may further include step S402: The network device sends first indication information to the terminal device, where the first indication information is used to instruct to switch an active BWP region of the terminal device to the second BWP.

Step S403: The network device sends second indication information to the terminal device, where the second indication information carries the offset value. The second indication information may be DCI signaling. The second indication information and the first indication information may be simultaneously sent, or the second indication information may be carried in the first indication information, or the second indication information may be sent after the first indication information.

In this embodiment of this application, the network device may determine the offset value, and then indicate the offset value to the terminal device. In an example, the network device may determine the offset value based on the first power, the first BWP, the second BWP, and the like and in comprehensive consideration of channel quality and the like, and indicate the offset value to the terminal device.

Step S404: The terminal device determines the offset value based on the second indication information.

Step S405: The terminal device determines a second power based on the offset value and the first power.

Step S406: The terminal device sends the first uplink channel to the network device at the second power in a second time unit of the second BWP.

In this embodiment of this application, the network device may determine the offset value, and then directly indicate the offset value to the terminal device, and the terminal device does not need to determine the offset value, thereby reducing power consumption of the terminal device.

Figure 5:
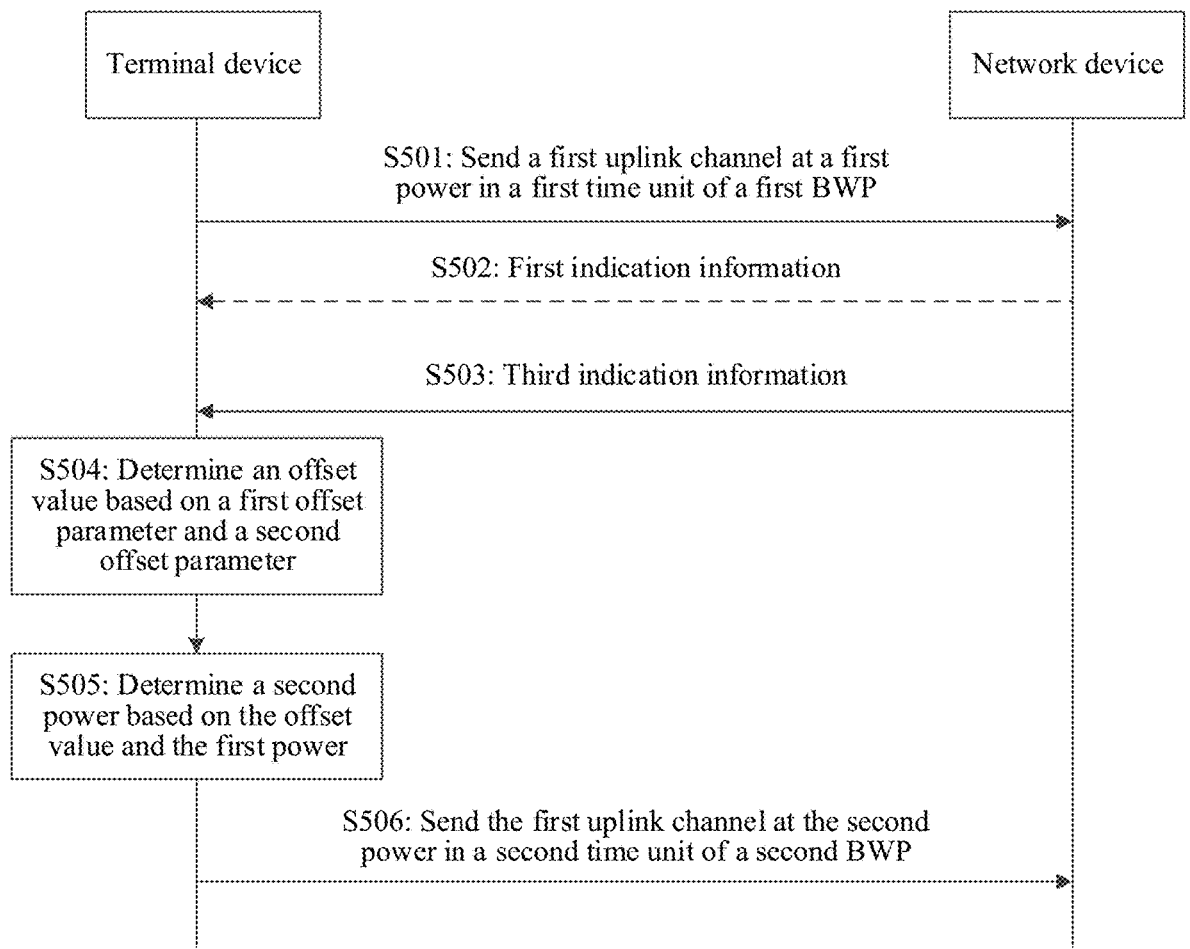

Based on the communications system 100 in FIG. 1, as shown in FIG. 5, this application provides an uplink channel sending method. In FIG. 5, a terminal device may be the UE 102 in FIG. 1, and a network device may be the base station 101 in FIG. 1. The method includes the following steps.

Step S501: The terminal device sends a first uplink channel to the network device at a first power in a first time unit of a first BWP.

Optionally, after step S501, the method may further include step S502: The network device sends first indication information to the terminal device, where the first indication information is used to instruct to switch an active BWP region of the terminal device to the second BWP.

Step S503: The network device sends third indication information to the terminal device, where the third indication information is used to indicate a first offset parameter and a second offset parameter, the first offset parameter corresponds to the first BWP, and the second offset parameter corresponds to the second BWP. For example, the third indication information may be DCI signaling. The third indication information and the first indication information may be simultaneously sent, or the third indication information may be carried in the first indication information, or the third indication information may be sent after the first indication information.

In this embodiment of this application, the terminal device side may store a correspondence between an offset parameter and a BWP region. The correspondence between an offset parameter and a BWP region may be predefined, or may be configured using higher layer signaling. The higher layer signal may be radio resource control (RRC) signaling.

Step S504: The terminal device determines the offset value based on the first offset parameter and the second offset parameter.

In this embodiment of this application, the terminal device side may store a formula for calculating the offset value based on the offset parameters. The terminal device may directly input the first offset parameter and the second offset parameter into the formula, to obtain the offset value.

Step S505: The terminal device determines a second power based on the offset value and the first power.

In this embodiment of this application, second power=first power+offset value, or second power=first power−offset value.

Step S506: The terminal device sends the first uplink channel to the network device at the second power in a second time unit of the second BWP.

Figure 6:
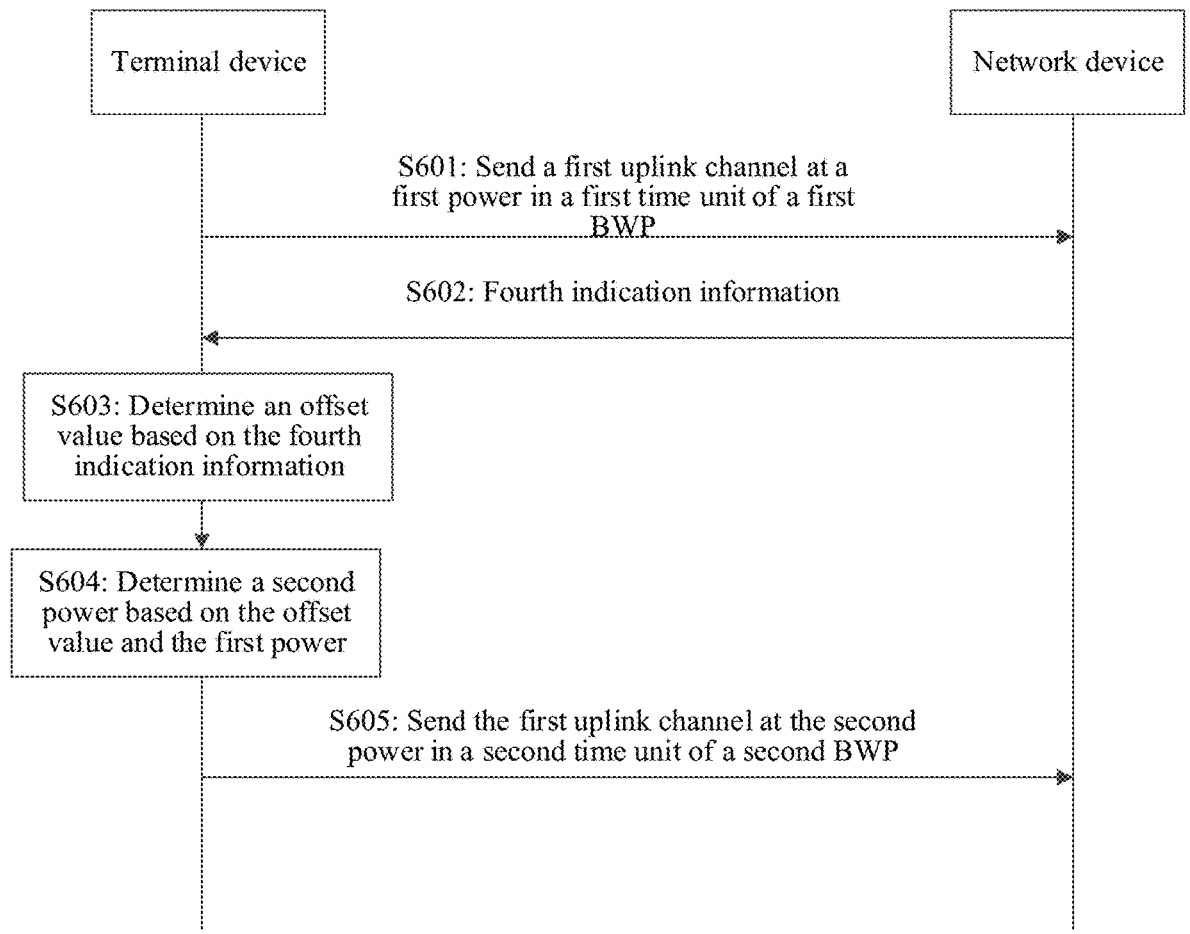

Based on the communications system 100 in FIG. 1, as shown in FIG. 6, this application provides an uplink channel sending method. In FIG. 6, a terminal device may be the UE 102 in FIG. 1, and a network device may be the base station 101 in FIG. 1. The method includes the following steps.

Step S601: The terminal device sends a first uplink channel to the network device at a first power in a first time unit of a first BWP.

Step S602: The network device sends fourth indication information to the terminal device, where the fourth indication information is used to instruct to switch an active bandwidth of the terminal device to a second BWP. The third indication information and the first indication information may be simultaneously sent, or the third indication information may be carried in the first indication information, or the third indication information may be sent after the first indication information.

Step S603: The terminal device determines the offset value based on the fourth indication information.

In this embodiment of this application, the terminal device side stores a correspondence between BWP switching and an offset value. The correspondence between BWP switching and an offset value may be predefined, or may be configured by the network device for the terminal device using RRC signaling.

In this embodiment of this application, the terminal device may query the correspondence between BWP switching and an offset value for an offset value corresponding to switching from the first BWP to the second BWP.

Step S604: The terminal device determines a second power based on the offset value and the first power.

In this embodiment of this application, second power=first power+offset value, or second power=first power−offset value.

Step S605: The terminal device sends the first uplink channel to the network device at the second power in a second time unit of the second BWP.

In this embodiment of this application, the network device may configure different closed-loop power control processes for the terminal device, and each process may include at least one time unit.

In an example of this application, the network device may configure two closed-loop power control processes for the terminal device: a first closed-loop power control process and a second closed-loop power control process.

An uplink channel of the first closed-loop power control process carries UCI, and an uplink channel in the second closed-loop power control process does not carry the UCI, or an uplink time unit in the first closed-loop power control process includes a first quantity of OFDM symbols, and an uplink time unit in the second closed-loop power control process includes a second quantity of OFDM symbols, or an uplink time unit in the first process is used to send a short uplink control channel, and an uplink time unit in the second process is used to send a long uplink control channel, or an uplink channel in the first process carries UCI and the UCI occupies a data amount less than or equal to a first bit, and an uplink channel in the second process carries UCI and the UCI occupies a data amount greater than the first bit.

In another example of this application, the network device may configure more than two closed-loop power control processes for the terminal device. Time units in all of the closed-loop power control processes include different quantities of OFDM symbols. For example, the network device may configure four closed-loop power control processes for the terminal device: a first closed-loop power control process, a second closed-loop power control process, a third closed-loop power control process, and a fourth closed-loop power control process. A time unit in the first closed-loop power control process includes 14 OFDM symbols, a time unit in the second closed-loop power control process includes two OFDM symbols, a time unit in the third closed-loop power control process includes four OFDM symbols, and a time unit in the fourth closed-loop power control process includes seven OFDM symbols.

Figure 7:
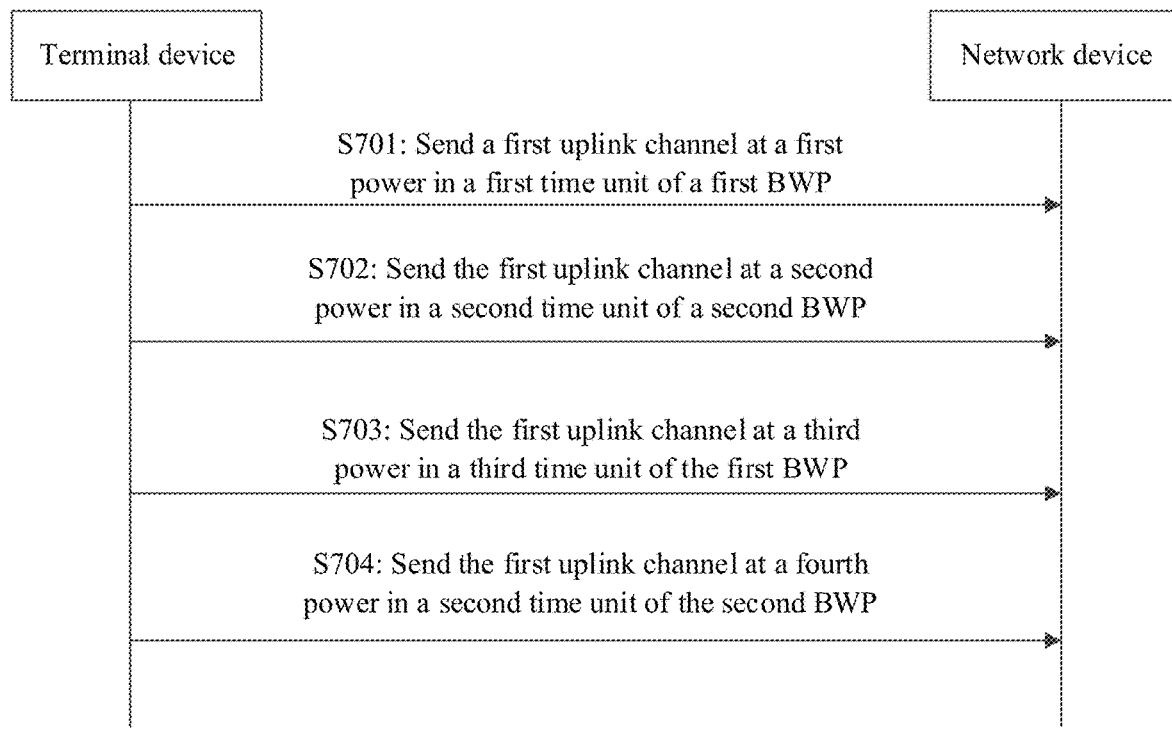
Figure 8:
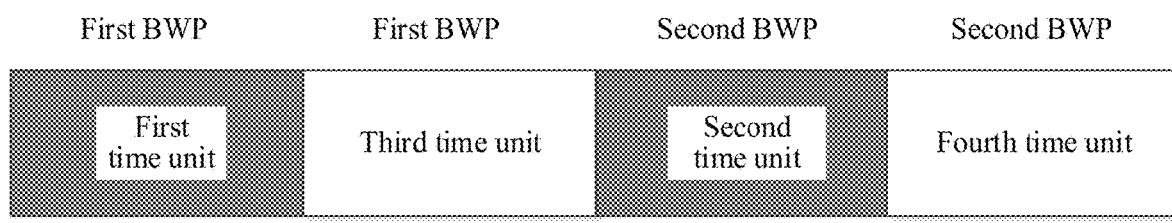
FIG. 8 is a schematic diagram of a time unit according to an embodiment of this application.

Based on the communications system 100 in FIG. 1, as shown in FIG. 7, this application provides an uplink channel sending method. In FIG. 7, a terminal device may be the UE 102 in FIG. 1, and a network device may be the base station 101 in FIG. 1. In this method, the network device configures at least a first closed-loop power control process and a second closed-loop power control process for the terminal device. The first closed-loop power control process includes a first time unit and a second time unit, and the second closed-loop power control process includes a third time unit and a fourth time unit. As shown in FIG. 8, the four time units are arranged in a time sequence the first time unit, the third time unit, the second time unit, and the fourth time unit. In addition, the first time unit and the third time unit correspond to a first BWP, and the second time unit and the fourth time unit correspond to a second BWP. That is, a BWP activated in the third time unit and the fourth time unit is switched from the first BWP to the second BWP. The method includes the following steps.

Step S701: The terminal device sends a first uplink channel to the network device at a first power in the first time unit of the first BWP.

Step S702: The terminal device sends the first uplink channel to the network device at a second power in the second time unit of the second BWP.

In this embodiment of this application, the second time unit and the first time unit are adjacent time units in the first closed-loop power control process, and the second power is determined using a reset accumulated closed-loop power, or the second power is determined using an absolute closed-loop power, or the second power is determined using the first power and an offset value. For how to calculate the second power, refer to the description in the foregoing embodiments. Details are not described herein again.

Step S703: The terminal device sends the first uplink channel to the network device at a third power in the third time unit of the first BWP.

Step S704: The terminal device sends the first uplink channel to the network device at a fourth power in the fourth time unit of the second BWP.

In this embodiment of this application, the fourth power is determined using a reset accumulated closed-loop power, or the fourth power is determined using an absolute closed-loop power, or the fourth power is determined using the third power and an offset value, or the fourth power is determined using the second power.

In this embodiment of this application, for specific implementations of the first three manners for determining the fourth power, determining the fourth power using the reset accumulated closed-loop power, determining the fourth power using the absolute closed-loop power, and determining the fourth power using the third power and the offset value, refer to the foregoing manner for the second power. Details are not described herein again.

In an example of this application, the following manner may be used to determine the fourth power based on the second power, directly using the second power as the fourth power, or fourth power=second power+offset value, or fourth power=second power−offset value. For obtaining of the offset value, refer to the description of the foregoing embodiments.

Based on the communications system 100 in FIG. 1, this application provides a method for division into closed-loop power processes. In this method, UE may be the UE 102 in FIG. 1, a base station may be the base station 101 in FIG. 1, an uplink slot corresponds to the time unit in FIG. 2 to FIG. 8, a process may be corresponding to the closed-loop power process in FIG. 2 to FIG. 8, and a PUSCH corresponds to the first uplink channel in FIG. 2 to FIG. 8. The method may be as follows.

First, an uplink slot of the UE is divided into two processes in the following manners.

Manner 1: Transmission content of a PUSCH may be classified into three types: only data is carried, for example, an acknowledgement (ACK)/a negative-ACK (HACK), only UCI is carried, for example, periodic channel status information (CSI) (aperiodic CSI (A-CSI)), and both data and UCI are carried.

Figure 9:
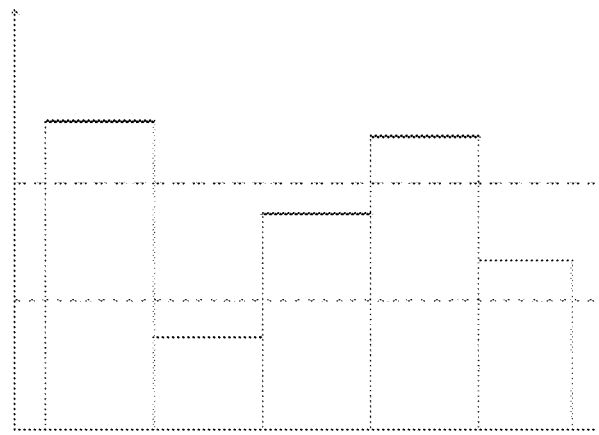
FIG. 9 is a schematic diagram of a PUSCH sending power according to an embodiment of this application.

As shown in FIG. 9, because the UCI and the data have different Block Error Rate (BLER) requirements, the UCI and the data require different transmit powers. Further, different processes may be configured for the UE depending on whether the PUSCH in the uplink slot carries the UCI.

Manner 2: In NR, there are two types of slots. One is a grant-free (data can be sent without scheduling information) slot, and the other is a grant-based (conventional data transmission) slot, that is, data can be sent only using scheduling data. Therefore, two processes may be configured for the UE. One process includes a grant-free slot, and the other process includes a grant-based slot.

Figure 10:
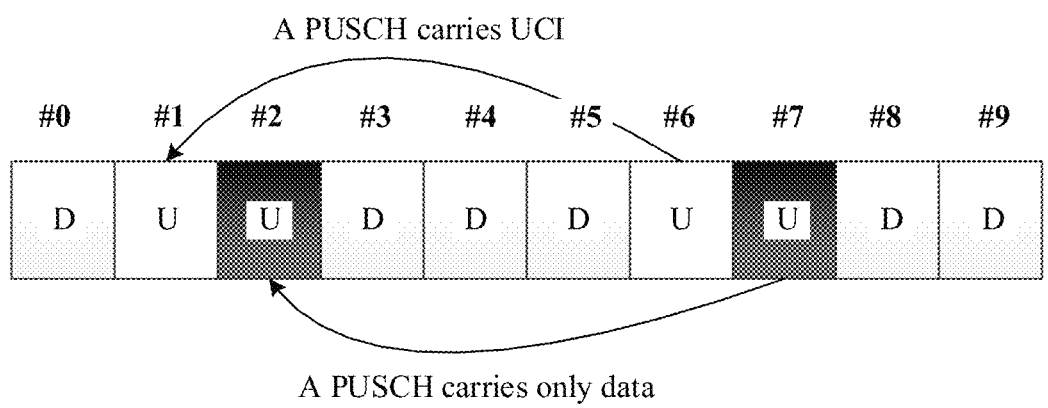
FIG. 10 is a schematic diagram of a division process according to an embodiment of this application.

As shown in FIG. 10, this embodiment of this application is described with reference to an example. For example, in a BWP, slots for sending a PUSCH carrying UCI are included in a process 1, and slots for sending a PUSCH that does not carry UCI are included in a process 2. As shown in FIG. 10, the slots included in the process 1 include #1, #6 . . . , and the slots included in the process 2 include #2, #7 . . . .

When BWP switching occurs, for example, switching from a BWP 1 to a BWP 2 occurs in a set 1, and a PUSCH that carries UCI cannot be found in the BWP 2 as a reference for next closed-loop power control, the following manners may be used.

(1) Accumulated closed-loop power control is reset in both the process 1 and the process 2.

(2) Adjustment is performed using an absolute closed-loop power in both the process 1 and the process 2.

(3) When an accumulated closed-loop power is calculated in the BWP 2 in the process 1, the accumulated closed-loop power is obtained using a data channel power in the BWP 1 as a reference. When accumulated closed-loop power control is calculated for the first time in the BWP 2 in the process 2, closed-loop power control accumulation may be performed based on a relative change with reference to a power change in the process 1.

(4) When BWP switching occurs, an offset 1 is indicated using RRC or DCI signaling, where the offset 1 corresponds to an offset value of the BWP 2 relative to the BWP 1 in closed-loop power control, and the offset value is related to channel quality, a bandwidth, or another factor. Closed-loop power adjustment is performed in the process 1 and the process 2 based on the offset 1.

In the foregoing embodiments provided in this application, the solutions of the uplink channel sending solution provided in the embodiments of this application are separately described from a perspective of the network elements and from a perspective of interaction between the network elements. It can be understood that the network elements, for example, the UE, the base station, and a control node, include corresponding hardware structures and/or software modules that perform the functions, to implement the foregoing functions. A person skilled in the art should be easily aware that, units and algorithm steps in the examples described with reference to the embodiments disclosed in this specification may be implemented in this application by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 11:
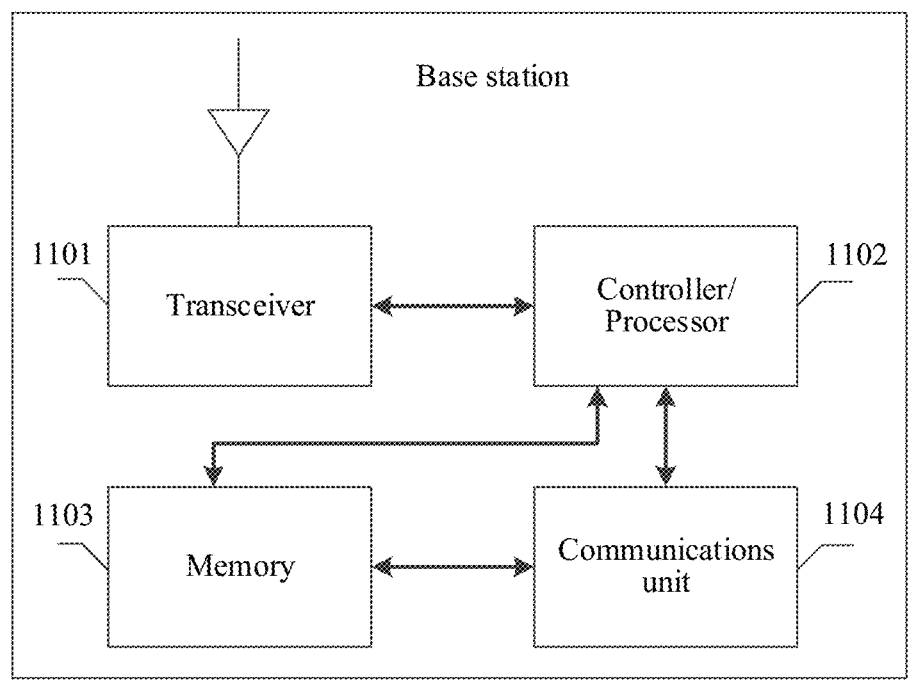
FIG. 11 is a schematic diagram of a base station according to an embodiment of this application.

FIG. 11 is a possible schematic structural diagram of the base station in the foregoing embodiments. The base station may be the base station 101 shown in FIG. 1, or the base station may be the terminal device in FIG. 2 to FIG. 7. The base station may include a transceiver 1101 and a controller/processor 1102. The transceiver 1101 may be configured to support information receiving and sending between the base station and the UE in the foregoing embodiments, and support radio communication between the UE and another UE. The controller/processor 1102 may be configured to perform various functions used to communicate with UE or another network device. In uplink, an uplink signal from the UE is received using an antenna, demodulated by the transceiver 1101, and further processed by the controller/processor 1102 to restore service data and signaling information that are sent by the UE. In downlink, service data and a signaling message are processed by the controller/processor 1102, and demodulated by the transceiver 1101, to generate a downlink signal, and the downlink signal is transmitted to the UE using the antenna. The transceiver 1101 is further configured to receive a first uplink channel sent by the UE to a network device at a first power in a first time unit of a first BWP region, and receive the first uplink channel sent to the network device at a second power in a second time unit of a second BWP region. The transceiver 1101 may be further configured to perform processing processes of the base station in FIG. 2 to FIG. 7 and/or other processes of the technology described in this application, for example, receive first indication information, second indication information, third indication information, and fourth indication information. The base station may further include a memory 1103 that can be configured to store program code and data of the base station. The base station may further include a communications unit 1104, to support the base station in communication with another network entity.

It may be understood that FIG. 11 merely shows a simplified design of the base station. In an actual application, the base station may include any quantity of transmitters, receivers, processors, controllers, memories, communications units, and the like, and all base stations that can implement the present disclosure shall fall within the protection scope of the present disclosure.

Figure 12:
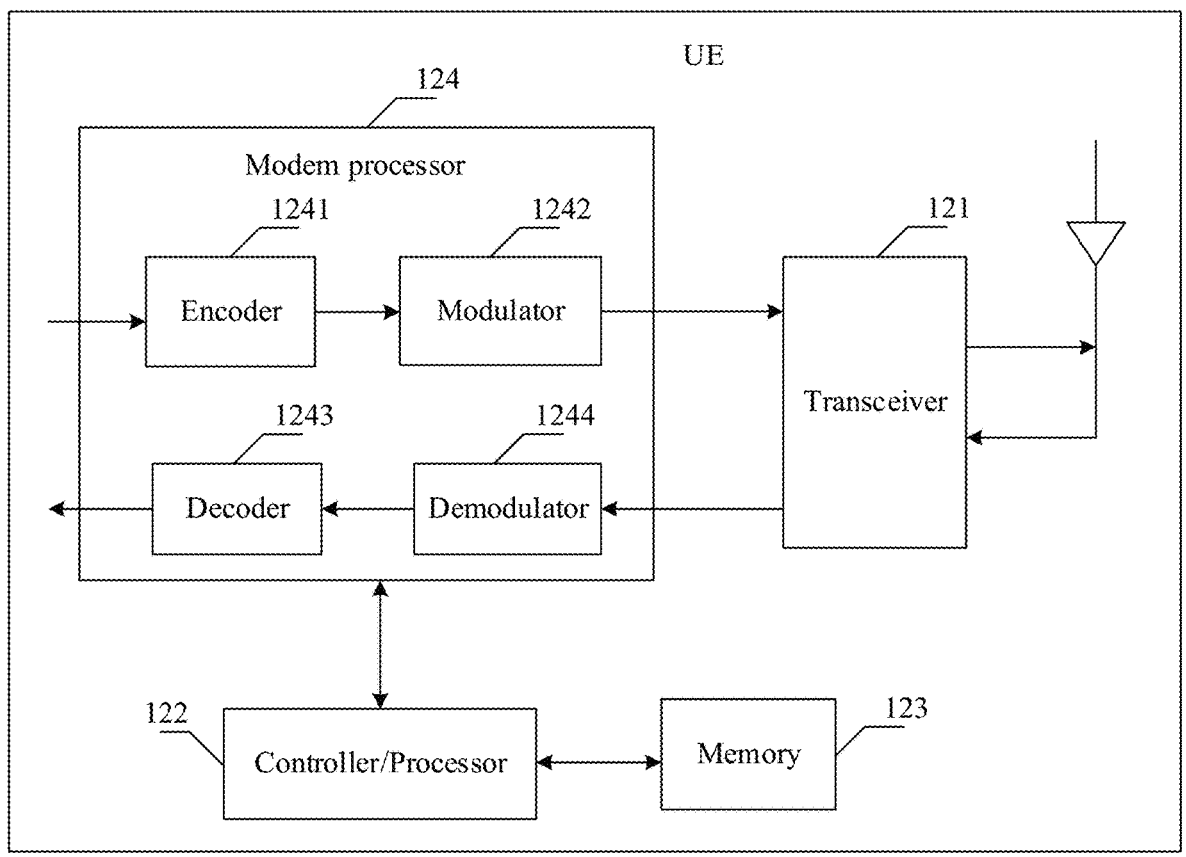
FIG. 12 is a schematic diagram of a user equipment (UE) according to an embodiment of this application.

FIG. 12 is a simplified schematic diagram of a possible design structure of UE in the foregoing embodiments. The UE may be the UE 101 shown in FIG. 1, or may be the terminal device in FIG. 2 to FIG. 7. The UE may include a transceiver 121, a controller/processor 122, and may further include a memory 123 and a modem processor 124.

The transceiver 121 adjusts (for example, performs analog conversion, filtering, amplification, and up-conversion on) an output sample and generates an uplink signal, where the uplink signal is transmitted to the base station in the foregoing embodiments using an antenna. In downlink, the antenna receives a downlink signal transmitted by the base station in the foregoing embodiments. The transceiver 121 adjusts (for example, performs filtering, amplification, down-conversion, and digitization on) a signal received from an antenna and provides an input sample. An encoder 1241 of the modem processor 124 receives service data and a signaling message that are to be sent in uplink, and processes (for example, formats, encodes, and interleaves) the service data and the signaling message. A modulator 1242 further processes (for example, performs symbol mapping and modulation on) the encoded service data and signaling message, and provides an output sample. A demodulator 1244 processes (for example, demodulates) the input sample and provides a symbol estimate. A decoder 1243 processes (for example, de-interleaves and decodes) the symbol estimate and provides decoded data and a decoded signaling message that are sent to the UE. The encoder 1241, the modulator 1242, the demodulator 1244, and the decoder 1243 may be implemented by the combined modem processor 124. These units perform processing based on a RAT (for example, an LTE access technology and an access technology based on another evolved system) used in a radio access network.

The transceiver 121 is configured to communicate with the base station, for example, send a first uplink channel, and perform actions related to the transceiver in FIG. 2 to FIG. 7. The memory 123 is configured to store program code and data of the UE.

Figure 13:
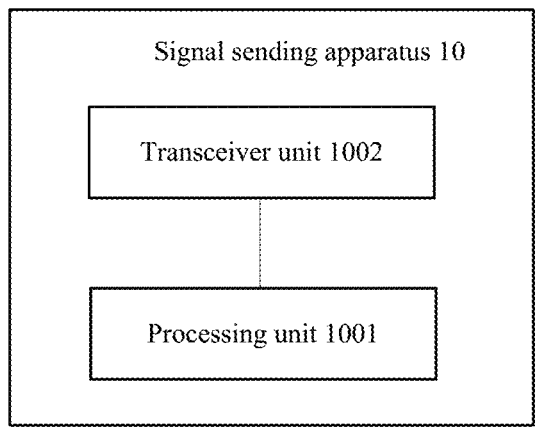
FIG. 13 is a schematic diagram of a signal sending apparatus according to an embodiment of this application.

As shown in FIG. 13, an embodiment of this application further discloses a signal sending apparatus 10. The signal sending apparatus 10 may be the UE 102 in FIG. 1, or may be the terminal device in FIG. 2 to FIG. 7. The signal sending apparatus 10 includes a processing unit 1001 configured to determine a first power and a second power, and a transceiver unit 1002 configured to send a first uplink channel to a network device at a first power in a first time unit of a first BWP region, and send the first uplink channel to the network device at a second power in a second time unit of a second BWP region, where the second time unit is adjacent to the first time unit, the second BWP region is different from the first BWP region, and the second power is determined using a reset accumulated closed-loop power, or the second power is determined using an absolute closed-loop power, or the second power is determined using the first power and an offset value.

The transceiver unit 1002 is further configured to receive first indication information sent by the network device, where the first indication information is used to instruct to switch an active BWP region of the terminal device to the second BWP region.

In this embodiment of this application, when the second power is determined using the first power and the offset value, the processing unit 1001 obtains the offset value in the following manner obtaining a parameter that affects the offset value, and determining the offset value based on the parameter. The parameter that affects the offset value includes at least one of channel quality, a bandwidth of the first BWP region, a bandwidth of the second BWP region, a center frequency of the first BWP region, a center frequency of the second BWP region, a type of uplink information, a beam direction, and a waveform type.

In an example of this application, when the second power is determined using the first power and the offset value, the transceiver unit 1002 is further configured to receive second indication information sent by the network device, where the second indication information carries the offset value, and the processor is further configured to determine the offset value based on the second indication information.

In an example of this application, when the second power is determined using the first power and the offset value, the transceiver unit 1002 is further configured to receive third indication information sent by the network device, where the third indication information is used to indicate a first offset parameter and a second offset parameter, the first offset parameter corresponds to the first BWP region, and the second offset parameter corresponds to the second BWP region, and the processor is further configured to determine the offset value based on the first offset parameter and the second offset parameter.

In an example of this application, when the second power is determined using the first power and the offset value, the transceiver unit 1002 is further configured to receive fourth indication information sent by the network device, where the fourth indication information is used to instruct to switch an active bandwidth of the terminal device to the second bandwidth region, and the processing unit 1001 is further configured to determine the offset value based on the fourth indication information.

In this application, at least one closed-loop power control process is configured for the terminal device, and the first time unit and the second time unit are adjacent time units in a same closed-loop power control process. A first closed-loop power control process and a second closed-loop power control process are configured for the terminal device, and an uplink channel in the first closed-loop power control process carries UCI, and an uplink channel in the second closed-loop power control process does not carry the UCI, or an uplink time unit in the first closed-loop power control process includes a first quantity of OFDM symbols, and an uplink time unit in the second closed-loop power control process includes a second quantity of OFDM symbols, or an uplink time unit in the first process is used to send a short uplink control channel, and an uplink time unit in the second process is used to send a long uplink control channel, or an uplink channel in the first process carries UCI and the UCI occupies a data amount less than or equal to a first bit, and an uplink channel in the second process carries UCI and the UCI occupies a data amount greater than the first bit.

In an example of this application, the first closed-loop power control process includes the first time unit and the second time unit, and the second closed-loop power control process includes a third time unit and a fourth time unit, and the transceiver unit 1002 is further configured to send the first uplink channel to the network device at a third power in the third time unit of the first BWP region, and send the first uplink channel to the network device at a fourth power in the fourth time unit of the second BWP region. The fourth power is determined using a reset accumulated closed-loop power, or the fourth power is determined using an absolute closed-loop power, or the fourth power is determined using the third power and an offset value, or the fourth power is determined using the second power.

Figure 14:
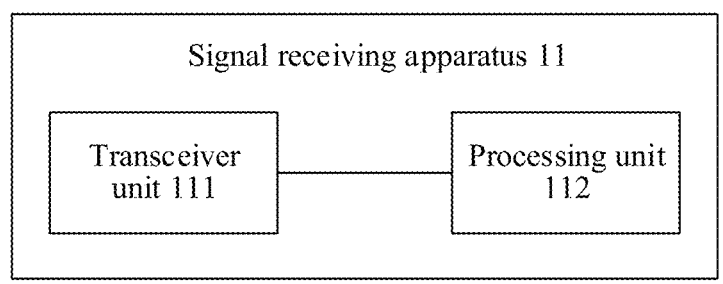
FIG. 14 is a schematic diagram of a signal receiving apparatus according to an embodiment of this application.

As shown in FIG. 14, an embodiment of this application further discloses a signal receiving apparatus 11. The signal receiving apparatus may be the base station 101 in FIG. 1, or may be the network device in FIG. 2 to FIG. 7. The signal receiving apparatus 11 includes a transceiver unit 111 configured to receive, in a first time unit of a first BWP region, a first uplink channel sent by a terminal device at a first power, and receive, in a second time unit of a second BWP region, the first uplink channel sent by the terminal device at a second power, where the second time unit is adjacent to the first time unit, the second BWP region is different from the first BWP region, and the second power is determined using a reset accumulated closed-loop power, or the second power is determined using an absolute closed-loop power, or the second power is determined using the first power and an offset value, and a processing unit 112 configured to process the first uplink channel.

In an example of this application, the transceiver unit 111 is further configured to send first indication information to the terminal device, where the first indication information is used to instruct to switch an active BWP region of the terminal device to the second BWP region.

In an example of this application, the transceiver unit 111 is further configured to send second indication information to the terminal device, where the second indication information carries the offset value.

In an example of this application, the transceiver unit 111 is further configured to send third indication information to the terminal device, where the third indication information is used to indicate a first offset parameter and a second offset parameter, and the first offset parameter and the second offset parameter are used to determine the offset value.

In an example of this application, at least one closed-loop power control process is configured for the terminal device, and the first time unit and the second time unit are adjacent time units in a same closed-loop power control process. A first closed-loop power control process and a second closed-loop power control process are configured for the terminal device, and an uplink channel in the first closed-loop power control process carries UCI, and an uplink channel in the second closed-loop power control process does not carry the UCI, or an uplink time unit in the first closed-loop power control process includes a first quantity of OFDM symbols, and an uplink time unit in the second closed-loop power control process includes a second quantity of OFDM symbols, or an uplink time unit in the first process is used to send a short uplink control channel, and an uplink time unit in the second process is used to send a long uplink control channel, or an uplink channel in the first process carries UCI and the UCI occupies a data amount less than or equal to a first bit, and an uplink channel in the second process carries UCI and the UCI occupies a data amount greater than the first bit.

In an example of this application, the first closed-loop power control process includes the first time unit and the second time unit, and the second closed-loop power control process includes a third time unit and a fourth time unit.

The transceiver unit 111 is further configured to receive, in the third time unit of the first BWP region, the first uplink channel sent by the terminal device at a third power, and receive, in the fourth time unit of the second BWP region, the first uplink channel sent by the terminal device at a fourth power. The fourth power is determined using a reset accumulated closed-loop power, or the fourth power is determined using an absolute closed-loop power, or the fourth power is determined using the third power and an offset value, or the fourth power is determined using the second power.

Figure 15:
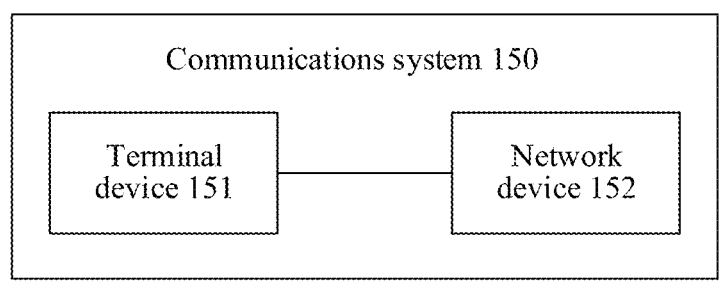
FIG. 15 is a schematic diagram of a communications system according to an embodiment of this application.

As shown in FIG. 15, this application further provides a communications system 150. The communications system 150 may include the terminal device 151 and the network device 152 in the foregoing embodiments. For the description of the terminal device 151 and the network device 152, refer to the foregoing description.

This application further provides a computer readable storage medium, including an instruction. When the instruction is run on a communications device, the communications device is enabled to perform the signal sending method or the signal receiving method shown in the foregoing embodiments.

This application further provides a chip. The chip is connected to a memory, and is configured to read and execute a software program stored in the memory, to implement the signal sending method or the signal receiving method described in the foregoing embodiments.

This application further provides an apparatus, including a processor and a memory. The memory stores a program or an instruction, and when the program or the instruction is executed by the processor, the signal sending method or the signal receiving method described in the foregoing embodiments is implemented.

Methods or algorithm steps described with reference to the content disclosed in the present disclosure may be implemented by hardware, or may be implemented by a processor by executing a software instruction. The software instruction may include a corresponding software module. The software module may be located in a random access memory (RAM), a flash memory, a read-only memory (ROM), an erasable programmable ROM (EPROM), an electrically EPROM (EEPROM), a register, a hard disk, a removable hard disk, a compact-disc ROM (CD-ROM), or a storage medium of any other form well known in the art. For example, a storage medium is coupled to the processor such that the processor can read information from the storage medium or write information into the storage medium. Certainly, the storage medium may alternatively be a component of the processor. The processor and the storage medium may be located in an application-specific integrated circuit (ASIC). In addition, the ASIC may be located in user equipment. Certainly, the processor and the storage medium may alternatively be in the user equipment as discrete components.

A person skilled in the art should be aware that in the foregoing one or more examples, the functions described in the present disclosure may be implemented using hardware, software, firmware, or any combination thereof. When the functions are implemented by software, the functions may be stored in a computer readable medium or transmitted as one or more instructions or code in the computer readable medium. The computer readable medium includes a computer storage medium and a communications medium. The communications medium includes any medium that enables a computer program to be transmitted from one place to another place. The storage medium may be any available medium accessible by a general-purpose or dedicated computer.

The objectives, technical solutions, and benefits of the present disclosure are further described in detail in the foregoing specific implementations. It should be understood that the foregoing description is merely specific implementations of the present disclosure, but are not intended to limit the protection scope of the present disclosure. Any modification, equivalent replacement, or improvement made based on the technical solutions of the present disclosure shall fall within the protection scope of the present disclosure.

What is claimed is:

1. An uplink channel sending method implemented by a terminal device, wherein the method comprises:
    sending, to a network device, a first uplink channel at a first power in a first time unit of at least two time units of a first Bandwidth Part (BWP) region;
    determining a second power using a reset accumulated closed-loop power, an absolute closed-loop power, or the first power and an offset value;
    sending, to the network device, the first uplink channel at the second power in a second time unit of at least two time units of a second BWP region, wherein a first closed-loop power control process of the terminal device comprises the first time unit and the second time unit, wherein the second time unit is adjacent to the first time unit in a same closed-loop power control process, wherein the second BWP region is different from the first BWP region, and wherein a second closed-loop power control process of the terminal device comprises a third time unit and a fourth time unit;
    sending the first uplink channel to the network device at a third power in the third time unit of the at least two time units of the first BWP region;
    determining a fourth power using the reset accumulated closed-loop power, the absolute closed-loop power, the third power and a second offset value, or the second power; and
    sending the first uplink channel to the network device at the fourth power in the fourth time unit of the at least two time units of the second BWP region.

2. The uplink channel sending method of claim 1, wherein before sending the first uplink channel to the network device at the second power, the uplink channel sending method further comprises receiving a first indication information from the network device, and wherein the first indication information instructs to switch an active BWP region of the terminal device to the second BWP region.

3. The uplink channel sending method of claim 1, further comprising:
    obtaining a parameter that affects the offset value, wherein the parameter comprises at least one of a channel quality, a bandwidth of the first BWP region, a bandwidth of the second BWP region, a center frequency of the first BWP region, a center frequency of the second BWP region, a type of uplink information, a beam direction, or a waveform type; and
    obtaining the offset value based on the parameter.

4. The uplink channel sending method of claim 1, further comprising:
    receiving a second indication information carrying the offset value from the network device; and determining the offset value based on the second indication information.

5. The uplink channel sending method of claim 1, further comprising:
receiving a third indication information from the network device, wherein the third indication information indicates a first offset parameter and a second offset parameter, wherein the first offset parameter corresponds to the first BWP region, and wherein the second offset parameter corresponds to the second BWP region; and
determining the offset value based on the first offset parameter and the second offset parameter.

6. The uplink channel sending method of claim 1, further comprising:
receiving a fourth indication information from the network device, wherein the fourth indication information instructs to switch an active BWP region of the terminal device to the second BWP region; and
determining the offset value based on the fourth indication information.

7. The uplink channel sending method of claim 1, wherein a plurality of closed-loop power control processes is configured for the terminal device, and wherein the first time unit and the second time unit are adjacent time units in a same closed-loop power control process.

8. The uplink channel sending method of claim 7, wherein:
a second uplink channel in the first closed-loop power control process carries uplink control information (UCI), and wherein a third uplink channel in the second closed-loop power control process does not carry the UCI;
a first uplink time unit in the first closed-loop power control process comprises a first quantity of orthogonal frequency-division multiplexing (OFDM) symbols, and wherein a second uplink time unit in the second closed-loop power control process comprises a second quantity of OFDM symbols;
the first uplink time unit sends a short uplink control channel, and wherein the second uplink time unit sends a long uplink control channel; or
the second uplink channel carries a first UCI occupying a first data amount less than or equal to a first bit, and wherein the third uplink channel carries a second UCI occupying a second data amount greater than the first bit.

9. A terminal device comprising:
a processor configured to:
determine a first power; and
determine a second power using a reset accumulated closed-loop power, an absolute closed-loop power, or the first power and an offset value; and
a transceiver coupled to the processor and configured to:
send, to a network device, a first uplink channel at the first power in a first time unit of at least two time units of a first Bandwidth Part (BWP) region;
send, to the network device, the first uplink channel at the second power in a second time unit of at least two time units of a second BWP region, wherein a first closed-loop power control process and a second closed-loop power control process are configured for the terminal device, wherein the first closed-loop power control process comprises the first time unit and the second time unit, wherein the second time unit is adjacent to the first time unit in a same closed-loop power control process, wherein the second BWP region is different from the first BWP region, and wherein the second closed-loop power control process comprises a third time unit and a fourth time unit;
send, to the network device, the first uplink channel at a third power in the third time unit of the at least two time units of the first BWP region;
determine a fourth power using the reset accumulated closed-loop power, the absolute closed-loop power, the third power and a second offset value, or the second power; and
send, to the network device, the first uplink channel at the fourth power in the fourth time unit of the at least two time units of the second BWP region.

10. The terminal device of claim 9, wherein the transceiver is further configured to receive a first indication information from the network device, and wherein the first indication information instructs to switch an active BWP region of the terminal device to the second BWP region.

11. The terminal device of claim 9, wherein the processor is further configured to:
obtain a parameter that affects the offset value, wherein the parameter comprises at least one of a channel quality, a bandwidth of the first BWP region, a bandwidth of the second BWP region, a center frequency of the first BWP region, a center frequency of the second BWP region, a type of uplink information, a beam direction, or a waveform type; and
obtain the offset value based on the parameter.

12. The terminal device of claim 9, wherein the transceiver is further configured to receive a second indication information carrying the offset value from the network device, and wherein the processor is further configured to determine the offset value based on the second indication information.

13. The terminal device of claim 9, wherein the transceiver is further configured to receive a third indication information from the network device, wherein the third indication information indicates a first offset parameter and a second offset parameter, wherein the first offset parameter corresponds to the first BWP region, wherein the second offset parameter corresponds to the second BWP region, and wherein the processor is further configured to determine the offset value based on the first offset parameter and the second offset parameter.

14. The terminal device of claim 9, wherein the transceiver is further configured to receive a fourth indication information from the network device, wherein the fourth indication information instructs to switch an active BWP region of the terminal device to the second BWP region, and wherein the processor is further configured to determine the offset value based on the fourth indication information.

15. The terminal device of claim 9, wherein a plurality of closed-loop power control processes is configured for the terminal device, and wherein the first time unit and the second time unit are adjacent time units in a same closed-loop power control process.

16. The terminal device of claim 15, wherein:
a second uplink channel in the first closed-loop power control process carries uplink control information (UCI), and wherein a third uplink channel in the second closed-loop power control process does not carry the UCI;
a first uplink time unit in the first closed-loop power control process comprises a first quantity of orthogonal frequency-division multiplexing (OFDM) symbols, and wherein a second uplink time unit in the second closed-loop power control process comprises a second quantity of OFDM symbols;
the first uplink time unit sends a short uplink control channel, and wherein the second uplink time unit sends a long uplink control channel; or
the second uplink channel carries a first UCI occupying a first data amount less than or equal to a first bit, and wherein the third uplink channel carries a second UCI occupying a second data amount greater than the first bit.

17. A communications system comprising:
a terminal device comprising:
  a first processor configured to:
    determine a first power; and
    determine a second power using a reset accumulated closed-loop power, an absolute closed-loop power, or the first power and an offset value; and
  a first transceiver coupled to the first processor and configured to:
    send a first uplink channel at the first power in a first time unit of at least two time units of a first Bandwidth Part (BWP) region;
    send the first uplink channel at the second power in a second time unit of at least two time units of a second BWP region, wherein a first closed-loop power control process and a second closed-loop power control process are configured for the terminal device, wherein the first closed-loop power control process comprises the first time unit and the second time unit, wherein the second time unit is adjacent to the first time unit in a same closed-loop power control process, wherein the second BWP region is different from the first BWP region, and wherein the second closed-loop power control process comprises a third time unit and a fourth time unit;
    send the first uplink channel at a third power in the third time unit of the at least two time units of the first BWP region;
    determine a fourth power using the reset accumulated closed-loop power, the absolute closed-loop power, the third power and a second offset value, or the second power; and
    send the first uplink channel at the fourth power in the fourth time unit of the at least two time units of the second BWP region; and
a network device coupled to the terminal device and comprising:
  a second transceiver configured to:
    receive, in the first time unit of the first BWP region, the first uplink channel from the terminal device at the first power;
    receive, in the second time unit of the second BWP region, the first uplink channel from the terminal device at the second power;
    receive, in the third time unit of the first BWP region, the first uplink channel at the third power; and
    receive, in the fourth time unit of the second BWP region, the first uplink channel at the fourth power; and
  a second processor coupled to the second transceiver and configured to process the first uplink channel.

18. The communications system of claim 17, wherein the second transceiver is further configured to send first indication information to the terminal device, wherein the first indication information instructs to switch an active BWP region of the terminal device to the second BWP region.

19. The communications system of claim 17, wherein the first transceiver is further configured to receive a first indication information from the network device, and wherein the first indication information instructs to switch an active BWP region of the terminal device to the second BWP region.

20. The communications system of claim 17, wherein the first processor is further configured to:
  obtain a parameter that affects the offset value, wherein the parameter comprises at least one of a channel quality, a bandwidth of the first BWP region, a bandwidth of the second BWP region, a center frequency of the first BWP region, a center frequency of the second BWP region, a type of uplink information, a beam direction, or a waveform type; and
  obtain the offset value based on the parameter.

* * * * *